United States Patent [19]

Byram

[11] Patent Number: 4,661,980
[45] Date of Patent: Apr. 28, 1987

[54] INTERCEPT RESISTANT DATA TRANSMISSION SYSTEM

[75] Inventor: George W. Byram, San Diego, Calif.

[73] Assignee: The United States of America as represented by the Secretary of the Navy, Washington, D.C.

[21] Appl. No.: 397,338

[22] Filed: Jun. 25, 1982

[51] Int. Cl.⁴ ............................................. H04K 1/02
[52] U.S. Cl. ......................................... 380/46; 380/50
[58] Field of Search ................................... 371/32-35, 371/3, 15, 54; 178/22.09, 22.15, 22.19

[56] References Cited

U.S. PATENT DOCUMENTS

| | | | |
|---|---|---|---|
| 3,484,745 | 12/1969 | Sourgens | 371/32 |
| 3,536,833 | 10/1970 | Guanella | 178/22 |
| 3,641,494 | 2/1972 | Perrault et al. | 371/32 |
| 3,731,197 | 5/1973 | Clark | 325/32 |
| 3,773,977 | 11/1973 | Guanella | 179/1.5 S |
| 3,868,633 | 2/1975 | Neuse | 371/35 |
| 3,921,151 | 11/1975 | Guanella | 340/172.5 |
| 3,925,612 | 12/1975 | Guanella et al. | 178/22 |
| 3,970,790 | 7/1976 | Guanella | 179/1.5 S |
| 4,011,408 | 3/1977 | Miller | 179/1.5 R |
| 4,074,066 | 2/1978 | Ehrsam et al. | 178/22.09 |
| 4,078,152 | 3/1978 | Tuckerman, III | 178/22.09 |
| 4,079,195 | 3/1978 | Frutiger | 178/22 |
| 4,092,630 | 5/1978 | Van Duuren et al. | 371/32 |
| 4,125,744 | 11/1978 | Goodall | 179/1.5 R |
| 4,145,568 | 3/1979 | Ehrat | 178/22 |
| 4,181,816 | 1/1980 | Vasseur | 178/22 |

OTHER PUBLICATIONS

IBM Tech. Discl. Bull., vol. 24, No. 6, (11/81), pp. 2892-2896, Tang et al.

IBM Tech. Discl. Bull., vol. 24, No. 6 (11/81), pp. 2886-2891, Lin et al.

IBM Tech. Discl. Bull., vol. 22, No. 9 (2/80), pp. 4287-4290, Anch et al.

Primary Examiner—Salvatore Cangialosi
Attorney, Agent, or Firm—Ervin F. Johnston; John Stan

[57] ABSTRACT

A secure communication system, which may be safely used even in the presence of an enemy interceptor, includes a transmitter and a receiver.

The transmitter comprises a first modulo-2 adder, having as one input a sequence of N-bit binary numbers. A first random read-only memory (ROM), comprises a plurality of storage cells. The input of the ROM is connected to the output of the modulo-2 adder. Each of the cells of the ROM, which have distinct addresses, contain a random number, with no two cells containing the same random number. The input to the ROM is a binary number representing a specific address, whereas the output of the ROM is a signal representing a random binary number. A delay line has its input connected to the output of the random read-only memory, its output constituting the second input to the modulo-2 adder. A second random ROM, having the same type of hardware but different random content, has its input connected to the output of the delay line. A second modulo-2 adder has its two inputs connected to the outputs of the first and second random read-only memories, the sequence of binary bits to be transmitted appearing at its output. Another component of the transmitter is a buffer memory, whose input and output are connected to the output of the second modulo-2 adder, the sequence of binary words to be transmitted appearing at the output of the second modulo-2 adder.

15 Claims, 5 Drawing Figures

BASIC SECURE COMMUNICATION SYSTEM

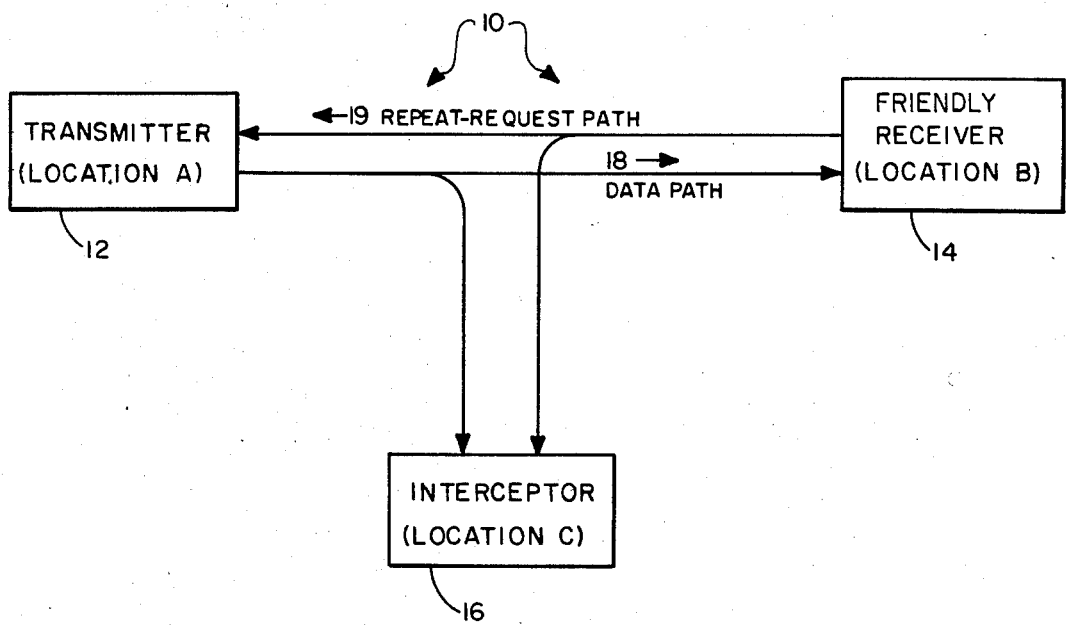
FIG. 1. BASIC SECURE COMMUNICATION SYSTEM
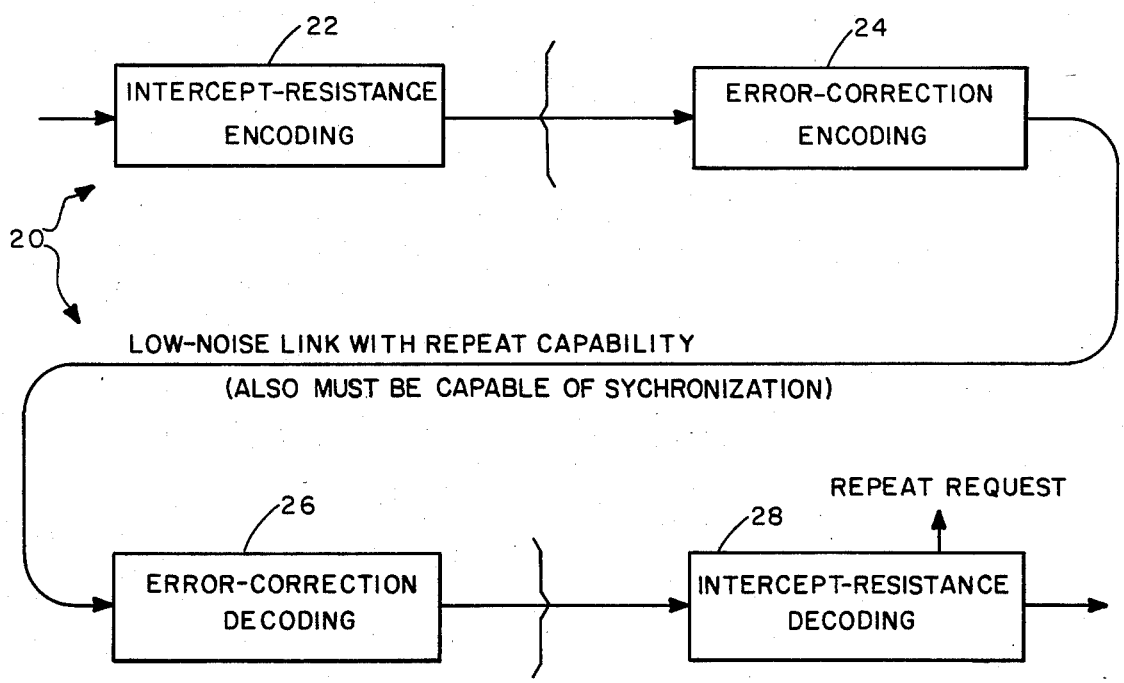
FIG. 2. INTERCEPT-RESISTANT SYSTEM

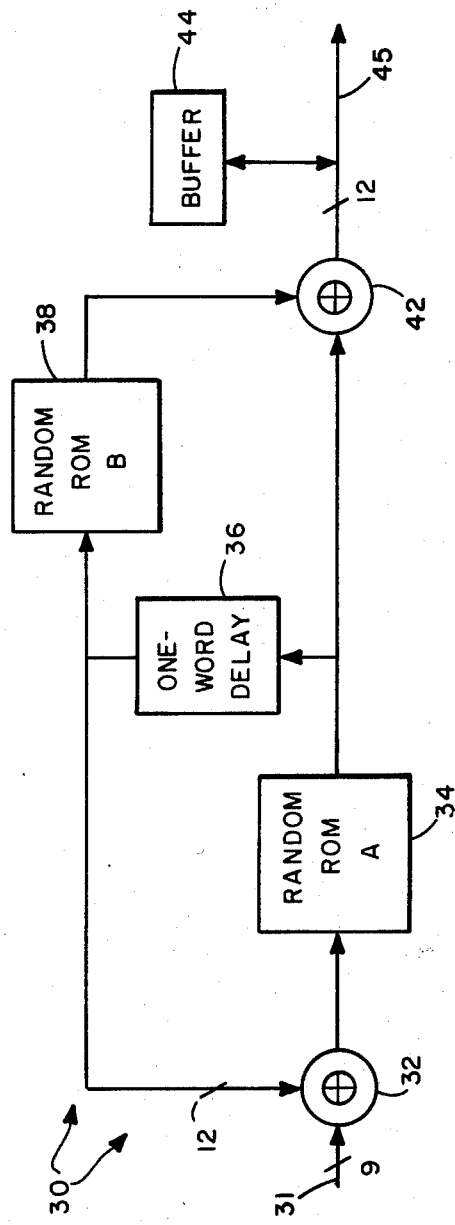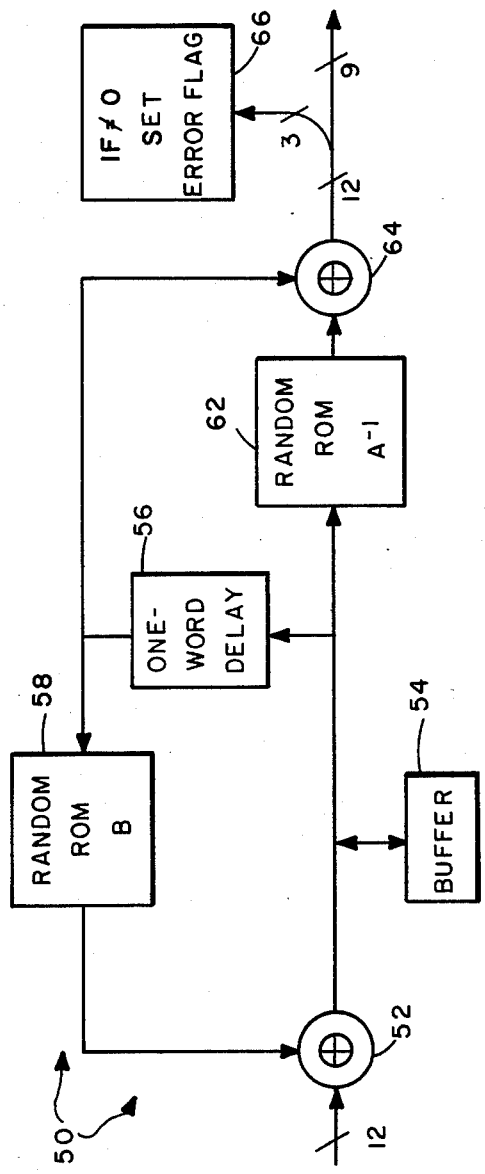
FIG. 3. TRANSMITTER FOR INTERCEPT-RESISTANT SYSTEM
FIG. 4. RECEIVER FOR INTERCEPT-RESISTANT SYSTEM

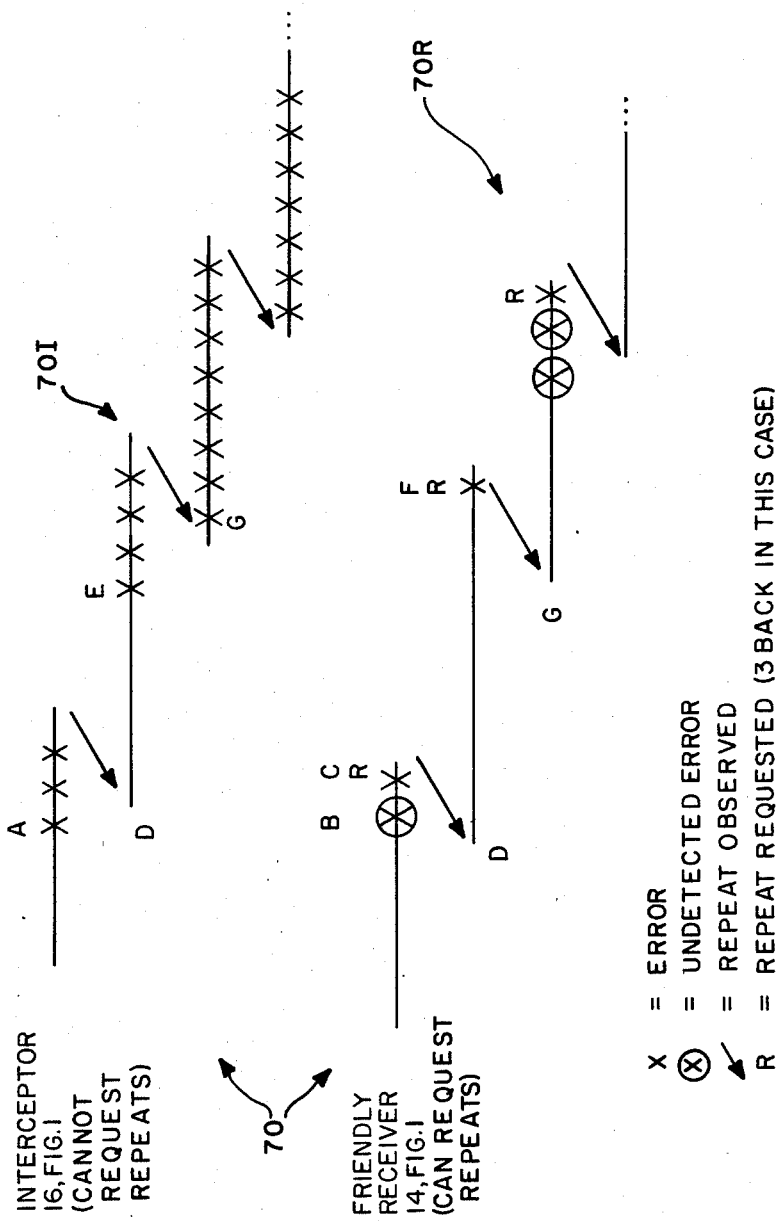
FIG. 5. GRAPHIC DEPICTION OF SYSTEM OPERATION

INTERCEPT RESISTANT DATA TRANSMISSION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Existing secure transmission systems depend on encryption to prevent an interceptor from extracting information from a message. This typically requires a key, or code, known to both the transmitter and the receiver but unknown to the interceptor. Relatively high costs are associated with continual renewal of the code. There is also the possibility that past data can be compromised by subsequent loss of its code, or key. Other systems, predicated on lack of the interceptor's knowledge of the system structure, will inevitably be compromised eventually and may provide false security until the compromise is discovered.

SUMMARY OF THE INVENTION

A secure communication system, which may be safely used even in the presence of an enemy interceptor, includes a transmitter and a receiver.

The transmitter (FIG. 3) comprises a first modulo-2 adder, having as one input a sequence of N-bit binary numbers. A first random read-only memory (ROM), labeled random ROM A, comprises a plurality of storage cells. The input of the ROM is connected to the output of the modulo-2 adder. Each of the cells of the ROM, which have distinct addresses, contain a random number, no two cells containing the same random number. The input to the ROM is a binary number representing a specific address, whereas the output of the ROM is a signal representing a random binary number. A delay line has its input connected to the output of the random read-only memory, its output constituting the second input to the modulo-2 adder.

A second random ROM, random ROM B, having the same type of hardware but different random content than the first random ROM, has its input connected to the output of the delay line. A second modulo-2 adder has its two inputs connected to the output of the first and second random read-only memories. Another component of the transmitter is a buffer memory, whose input and output are connected to the output of the second modulo-2 adder, the sequence of binary words to be transmitted appearing at the output of the second modulo-2 adder.

The receiver (FIG. 4) of the communication system comprises a first receiver modulo-2 adder, whose input is adapted to receive a signal consisting of a sequence of binary words.

The information in the sequence of words is written into a buffer memory. This information may also be read out from the buffer memory.

A delay line, whose input is connected to the outputs of the receiver modulo-2 adder and of the buffer memory, delays the words passing through it.

A first receiver random read-only memory (ROM), labeled random ROM B, has its input connected to the output of the delay line. The content of each of the cells of the ROM B is a random number. Each cell has a distinct address, with no two cells containing the same random number. The output of this ROM B comprises the second input to the first modulo-2 adder.

A second random receiver read-only memory, random ROM $A^{-1}$, has its input connected to the output of the first receiver modulo-2 adder. This ROM $A^{-1}$ is the inverse of the first ROM, ROM A, in the transmitter. The number stored in any of its addresses is equal to the address in the transmitter ROM A in which a number equal to that receiver ROM $A^{-1}$ address is stored.

Since the random ROMs are such an important part of the invention, their similarities and differences will be elaborated upon.

Three different types of random ROMs are used. Type B is used in both transmitter and receiver. Type A is used only in the transmitter. Type $A^{-1}$ is used only in the receiver. ROM $A^{-1}$ is the inverse of ROM A. The 4096 addresses of ROM A store the integers 0 to 4095 in some random order.

The 4096 addresses of $A^{-1}$ store integers which correspond to the addresses in A where integers corresponding to the addresses of $A^{-1}$ are stored.

Examples of ROM storages with 5 instead of 4096 addresses:

| ROM A | | ROM $A^{-1}$ | |
|---|---|---|---|
| Address | Number | Address | Number |
| 0 | 3 | 0 | 2 |
| 1 | 4 | 1 | 3 |
| 2 | 0 | 2 | 4 |
| 3 | 1 | 3 | 0 |
| 4 | 2 | 4 | 1 |

Returning back to a description of the receiver 50 in FIG. 4, a second receiver modulo-2 adder has its two inputs connected to the outputs of the delay line and of the second modulo-2 adder. The output signal of this modulo-2 adder corresponds to the signal supplied to the transmitter.

Generally in the communication system provision would be made for detecting an error in the output signal.

OBJECTS OF THE INVENTION

An object of the invention is to provide a secure communication system which is highly resistant to information extraction by an interceptor.

Another object of the invention is to provide such a secure system by strictly noncryptographic techniques.

Yet another object of the invention is to provide a secure system wherein prearranged codes available to both the transmitter and receiver are not required.

These and other objects of the invention will become more readily apparent from the ensuing specification when taken together with the drawings.

BRIEF DESCRIPTION OF THE DRAWINGS

FIG. 1 is a block diagram of the basic secure communication system.

FIG. 2 is a block diagram of the secure system showing the manner by which it is intercept-resistant.

FIG. 3 is a block diagram of the transmitter for the intercept-resistant system.

FIG. 4 is a block diagram of the receiver used for the intercept-resistant system.

FIG. 5 is a graphic depiction showing how the errors accumulate for the interceptor but are neutralized by the receiver.

DESCRIPTION OF THE PREFERRED EMBODIMENTS

The basic diagram of the secure system 10 is shown in FIG. 1. In this figure the transmitter 12 is at a location A, the receiver 14 is at location B and a potential interceptor 16 is at a third location, C.

There is a direct data path 18 from location A to B and a repeat-request path 19 from location B to A. It may be assumed that signals in both paths, 18 and 19, are monitored by the interceptor 16 at location C.

The transmissions from location A to B are made at a very low power level and are seen to be on a link not susceptible to external interference. An example of such a link would be an optical fiber.

Hence, the dominant noise source will be receiver 14 noise, which will be statistically independent between the receiver 14 at location B and a potential interceptor 16 at location C.

The interceptor 16 is assumed to have complete knowledge of the structure and operation of the transmitter 12 and receiver 14. There are no codes or keys unknown to the interceptor 16. All synchronization data is assumed available to the interceptor 16. It is, however, assumed that the interceptor 16 can not make a repeat-request without exposing his presence.

If the signal level is sufficiently low, both receivers, 14 and 16, will make frequent errors. Since their noise terms are independent, the errors will be independent and will not always coincide. If some redundancy is included in the transmitted signal, the receiver 14 will be able to detect the occurrence of an error and request a repeat transmission. An interceptor 16 cannot request a repeat without exposing his presence.

Referring now to FIG. 2, considerable care is required in providing the redundancy in the intercept resistance encoding since many common codes have an error correction capability in addition to their error detection capability. Use of the full correction capability and the full detection capability are generally mutually exclusive. As a result, a receiver 16 which cannot request repeats has less need for detection than correction and would use the full correction capability of the code. This would provide it initial advantage over receiver 14, which would have to sacrifice some correction capability to detect additional errors. It is assumed herein that the interceptor knows the system structure, which would include the error detecting/correcting code used in the data link.

For example, a system employing the common Golay (23, 12) code can detect up to 6 errors and correct none; or can detect up to 5 errors and correct 1; or can detect up to 4 errors and correct 2; or can detect 3 errors and correct all 3.

All codes based on maintaining a minimum distance between code words have similar tradeoffs. For purposes of this invention a code is required with good error detection capability and no error correction capability. It would also be highly desirable to trade off missed error probability against number of repeats, and to insure that no condition of error can continue indefinitely undetected.

Existing codes provide error-detection capability by appending check bits which are derived from the data bits. A check can then be made at the receiver (14 in FIG. 1) to determine whether the data and check positions of the received word are consistent. The structure imposed on the code words by this relationship restricts the number of possible code words to be significantly smaller than the total that could be represented by the total number of bits. As a result, a receiver can correct some errors by selecting the code word closest to the received word. This invention avoids that possibility by using check bits which are essentially random and unrelated to the data portion of the word. The effect of successive check bits propagates forward, and the output of the transmitter 12 depends on the entire history of its input since its initialization. The receiver 14 detects errors by checking for consistency of the effect of check bits over a two-word span.

Reference is now directed to the transmitter 30 shown in FIG. 3. The transmitter 30 can be viewed as the cascade of two sections: the recursive loop consisting of circuits 32, 34 and 36, and a finite-response section, comprising the balance of this figure. This separation is not obvious in the figure because the one-word delay 36 is shared by both sections.

In more detail, the recursive section comprises a first modulo-2 adder 32, to the left input of which is applied a signal consisting of a sequence of N-bit binary numbers, N being nine, as shown in FIG. 3. A first random read-only memory (ROM) 34 comprises a plurality of storage cells, the input of the ROM being connected to the output of the modulo-2 adder 32. Each of the cells of the ROM 34 have distinct addresses which contain a random number, no two cells containing the same random number. The input to the ROM 34 is a binary number representing a specific address, whereas the output signal is a random binary number. The third member of the recursive loop is a means 36 for delaying an input signal, whose input is connected to the output of a random read-only memory 34 and whose output constitutes the second input to the first modulo-2 adder 32.

The recursive section introduces a running dependence that makes the output, at 45, of the transmitter 30 depend on the entire history of its input since initialization. Since the output word, at 45, containing 12 bits is longer than the input word, which contains nine bits, redundancy is also being introduced. This permits the finite-response section of the receiver 50, to the right of delay line 36, to perform a test over two adjacent words to determine whether their redundancy is mutually consistent.

This combination of a recursive section at the transmitter 30 and a finite-response section at the receiver 50, FIG. 4, comprises the error detection capability of the system and could be used alone if desired.

The finite-response section of the transmitter 30 causes each transmitted word to depend on information contained in the previous word.

Referring now to FIG. 4, the corresponding receiver section used to invert that operation is recursive. Hence, the output of the receiver 50 depends on the entire history of its input since initialization. The recursive section comprises first receiver modulo-2 adder 52, having a 12-bit input, as shown. The output of the modulo-2 adder 52 is received by a buffer 54 and a receiver means for delaying 56. The output of delay 56 goes to receiver random ROM B, 58, its output forming the second input to modulo-2 adder 52. The recursive section of receiver 50 causes any errors which occur to propagate forward and cause all subsequent output to be in error. This capability of the invention could also be used separately if desired.

Used together the two capabilities of this system provide a simple but very effective technique for intercept-resistant data transmission.

To illustrate the operation of the system, an example will be worked through for the first few words transmitted and received. Although a specific number of bits and other parameters will be used in the example for clarity, it should be realized that a wide range of choices is possible to meet the needs of specific applications.

EXAMPLE

Word length at input 31 to transmitter 30, FIG. 3: 9 bits.

Repeat strategy to be used when error is detected: go back three words.

For the above choice of parameters, the following memory parameters were chosen:

Random read-only memory A, 34, size: 4096 12-bit words.

Buffer 44 size: 3 words minimum.

The random read-only memory B, 38, is arbitrary. The random memory A, 34, must be invertible. Random ordering of the integers 0–4095 is used for the contents of memory A, 34, and the address corresponding to a given random integer is used for the contents of random ROM $A^{-1}$, 62, FIG. 4, at that integer address, as indicated in the table of five binary words, hereinabove.

A different random ordering of the integers 0–4095 would also be one suitable choice for random ROM B, 38.

A 9-bit encode word at input 31, FIG. 3, is augmented by three zeroes to make a 12-bit word, at output 45. These three zeroes can be placed at any three bit positions in the 12-bit word provided that the same three positions are used for check bits in the receiver 50, FIG. 4.

Let it be assumed that the initial states of both transmitter 30, FIG. 3, and receiver 50, FIG. 4, are defined by zeroes in their buffer memories, 44 and 54, respectively, and in the memories, 36 and 56, respectively, corresponding to their one-word delays.

Assume that the input to the transmitter 30 is $W_0$, $W_1$, $W_2$, . . . , and assume that these correspond to the input words with three extra zeroes on the end. For notation, it will be assumed that $A(x)$ is the quantity stored in memory A at address x.

The first input, at 31, to the transmitter 30 is $W_0$ and the corresponding output, at 45, is $A(W_0) \oplus B(0)$, where the symbol $\oplus$ denotes bit-by-bit addition modulo-2.

The next input is $W_1$ and the corresponding output is $$A(W_1 \oplus A(W_0)) \oplus B(A(W_0))$$

Next, the following is obtained:

| In | Out |
|---|---|
| $W_2$ | $A(W_2 \oplus A(W_1 \oplus A(W_0))) \oplus B(A(W_1 \oplus A(W_0)))$ |

The increasing complexity of successive output terms reflects the dependence of each output on all previous inputs.

At the receiver 50, if there are no errors in transmission, as stated hereinabove, the first input will be: $A(W_0) \oplus B(0)$ In the first section of the receiver 50, this is summed modulo-2 with $B(0)$ giving $A(W_0) \oplus B(0) \oplus B(0) = A(W_0)$, which is then used as address in the memory $A^{-1}$, having reference numeral 62, to give $W_0$, which is unchanged by a modulo-2 sum with the initial condition of zeroes.

The next word into the receiver 50 is $$A(W_1 \oplus A(W_0)) \oplus B(A(W_0)),$$

which is summed modulo-2 with the new output from random ROM 58 at the new address from the one-word delay 56 to give $$A(W_1 \oplus A(W_0)) \oplus B(A(W_0)) \oplus B(A(W_0)).$$

This is inverted by random ROM 62 to give $W_1 \oplus A(W_0)$, which is summed modulo-2 in modulo-2 adder 64 with the output of the delay line 56 to give $$W_1 \oplus A(W_0) \oplus A(W_0) = W_1.$$

Examining one more case, the third word becomes $$A(W_2 \oplus A(W_1 \oplus A(W_0))) \oplus B(A(W_1 \oplus A(W_0))).$$

Again the last half of the expression is cancelled by modulo-2 summation with an identical term generated at the receiver 50, and after inversion by the memory 62 and modulo-2 summation in the receiver second modulo-2 adder 64 with the output of delay line 56, $W_2$, the expression is recovered.

Operation after an error is detected will now be described in detail.

Once the check bits fail to come up all zero, the receiver 50 knows that the last output word is in error. Circuit 66 detects the error. This can be due to an error in reception of that word or an undetected error in reception of a prior word, or both. For the system 50 shown in FIG. 4, wherein there are three check bits, the probability of an undetected error is $(\frac{1}{2})^3 = \frac{1}{8}$, and hence it is most likely that the current word was received incorrectly.

The best strategy then is to try a retransmission of that last word from the transmit buffer 44, FIG. 3. First, however, the internal 1-word delay, in delay line 56 of the receiver 50, must be reset from the receiver buffer 54 to its state immediately prior to reception of that word by the receiver. If the check bits are zero on the retransmission and subsequent transmissions, the correction has been successful.

If not, it will be necessary to go back further in the data stream and try again. The strategy of how far to go back on initial and subsequent correction attempts will depend on the specific application.

Now, suppose that an error occurred in reception of the second word so that the received word was $$A(W_1 \oplus A(W_0)) \oplus B(A(W_0)) \oplus E,$$

where E is the bit error pattern. In the first section of the receiver 50 the sum $$A(W_1 \oplus A(W_0)) \oplus B(A(W_0)) \oplus E \oplus B(A(W_0))$$

is computed, and one term is removed as before. The error pattern is still present, and hence gives the wrong address with which to enter memory 62. Hence, its output is $$A^{-1}(A(W_1 \oplus A(W_0)) \oplus E),$$

and, after summation with the term from the delay, has as receiver output $$A^{-1}(A(W_1 \oplus A(W_0)) \oplus E) \oplus A(W_0).$$

Since this output contains the output of random memory $A^{-1}$, 62, FIG. 4, at some unknown address, it is essentially randomly related to the correct output. Hence, the 9-bit data portion of the word is wrong and the three check bits are unlikely to be all zeroes. On the average, since there are eight possible combinations of three bits one would expect the chances of catching the error to be $\frac{7}{8}$. If it is now assumed that the error is not caught and that the next word is correctly received as $$A(W_2 \oplus A(W_1 \oplus A(W_0))) \oplus B(A(W_1 \oplus A(W_0))),$$

then the error stored in the delay line 56 of the receiver 50 would cause the output of the first modulo-2 sum, at the output of modulo-2 adder 52, to be $$A(W_2 \oplus A(W_1 \oplus A(W_0))) \oplus B(A(W_1 \oplus A(W_0))) \oplus \\ B(A(W_1 \oplus A(W_0))) \oplus E),$$

and after using this as address in memory 62 and computing the last sum modulo-2, there is obtained $$A^{-1}(A(W_2 \oplus A(W_1 \oplus A(W_0))) \oplus B(A(W_1 \oplus A(W_0))) \\ \oplus B(A(W_1 \oplus A(W_0))) \oplus E)) \oplus A(W_1 \oplus A(W_0))) \oplus E.$$

Again, the nine-bit data portion will be wrong and there is only a $\frac{1}{8}$ chance of all zeroes for the check bits.

The probability of missing an error N times in a row is roughly $(\frac{1}{8})^N$ since successive wrong receiver outputs can be considered to be independent random numbers. Hence the error probability can be controlled by deciding how far back, in binary words, to go once an error is detected. If one does not go back far enough, errors will continue to occur. Therefore, there is always the option of trying once more farther back if sufficient buffer memory is provided.

To illustrate the operation of the system 10 shown in FIG. 1, operation of the friendly receiver 14 and the interceptor's receiver 16 will be compared for a case in which, for simplicity, it is desired to go back three words when an error is detected by the friendly receiver 14.

The diagram 70 in FIG. 5 illustrates the processes involved. Looking across the diagram 70 from left to right, the following sequence of events occurs, the capital letters hereinbelow corresponding to the same letters in FIG. 5.

A. The intercept receiver makes an error, shown by X's at A in FIG. 5. Subsequent output is also in error.

B. The friendly receiver 14, FIG. 1, makes an error, but it is not detected, as indicated by the circled X. Subsequent output is also in error.

C. The friendly receiver detects an error and requests a repeat, indicated by the R, starting three words back.

D. The repeat sequence is observed by both receivers, and 16, and both recover from their errors.

E. The intercept receiver 16 makes an error.

F. The friendly receiver detects an error and requests a repeat sequence.

G. The repeat sequence is observed by both receivers, but does not extend back far enough to help the intercept receiver. Hence its subsequent output is in error. The friendly receiver continues to operate as before, with no error.

It is desired that event G occur as soon as possible. Hence, it is desirable that the friendly receiver's signal-to-noise ratio be as favorable as possible in order to reduce the number of repeats, while still keeping the signal level low enough so that the interceptor is making frequent errors. It is also important that the noise sources seen by the friendly receiver and the interceptor's receiver be independent.

A fiber optic link is particularly well suited for use with this technique since receiver noise dominates and is hence independent from receiver to receiver. It is also possible, through physical optics techniques, to restrict the amount of energy which can be covertly extracted from the link. This helps by limiting the signal-to-noise ratio available to an interceptor.

The recursive use of random memories makes it very difficult to pin down the statistics of a system. However, some rough estimates of the probability of an irrecoverable error by the interceptor can be made. If the probability of reception error for the desired receiver is $1/J$ and for the interceptor is $1/K$ and $L < J$ words are repeated, then on the average $(1-L/J)$ of the transmissions are not repeated. Hence, the chance of irrecoverable error for the interceptor is $(1/K)(1-L/J)$. In the most favorable case, $J >> K$ and a small L will be used.

The average probability that the friendly receiver will fail to detect an error is $2^{-z}$, where z is the number of zeroes added to the input word to make up the word length used in the rest of the system. The tradeoff in using a larger value of z is a lower effective data rate. The flexibility of this technique makes it well adapted for use in conjunction with existing systems in which some of the word lengths are already determined. It also permits wide choice of codes for use in the error correction part of the system.

The reason for retaining some error correction capability in the link between the transmitter and the receiver may not be apparent on first examination. The key purpose is to increase the number of possibilities once an error has occurred in order to make a trial and error reconstruction computationally prohibitive.

For example, consider the case examined hereinabove, in FIG. 3, in which the transmitted word, at output 45, is twelve bits long. When the interceptor 16, FIG. 1, makes an error for which a repeat is not provided, his best strategy, if error correction is not included, is to assume it was a single-bit error and test twelve one-bit modifications of the received word. On the average, only $12/2^3$ of these—say two—will have all three check bits zero. He would then continue with these two words in parallel paths and see which gave correct indications for subsequent words.

Now, if the Golay (23, 12) code for error correction was used and had operated at lower signal-to-noise level so that the error rate seen by the intrusion resistance portion of the system was the same as before, the situation would be quite different. All cases of three or less transmission errors in a word would be corrected by the Golay code.

Now, when an error is detected, the interceptor's best strategy is to try the Golay code words closest to the received word. There are 253 of these, distance seven away from the correct word. Of these, $253/2^3$, or roughly 32, will result in all-zero check bits. If he continues with 32 parallel channels, the check on the next word will give all zeroes in $32/2^3$, or four cases. Hence, even though he is limiting his trials to the most likely cases, the computational load is quite severe.

In practice, the transmitter would probably transmit random "garbage" for a time long enough to ensure high probability that the interceptor had made an irrecoverable error before starting the message.

There are two other areas which should be examined. The first is the question of soft-decision decoders for error correction. These can typically provide an advantage of roughly 2 dB over hard-decision decoders. If it is feasible for the friendly receiver to use soft decisions, that is quite desirable. If, however, that is too complex or expensive, then there is the threat that the interceptor will use soft decisions and improve his relative performance. This should be taken into account in the choice of an error-correction code. Techniques to force the use of hard decisions, in many cases, will probably be incompatible with the code word distance structure which gives the code its error-correction properties.

Choice of system parameters should take into account the time and computational capability available to an interceptor as well as the time value of the information being transmitted. It should be noted that a high degree of flexibility is available in determining the interceptor's computational burden since the word length determines the number of possible states and the number of check bits determines the convergence rate of an exhaustive brute force solution. These two variables can be chosen independently by setting any unused bits at random from a noise generator.

The system described herein may be used in a cryptographic mode. It should be noted that the choice of all zeroes for the initial state of the 1-word delay is arbitrary and that there are $2^W$ possibilities, where W is the word length. If an initial state known only to the transmitter 12, FIG. 1, and the friendly receiver 14 is used in the message preceded by truly random "garbage" (from a noise diode for example) an interceptor 16 would have quite a difficult time of reconstructing the message.

With respect to implementation, the entire processing structure of both the receiver and transmitter can be constructed from readily available digital integrated circuits. Specific chips selected would depend on requirements of the application, such as speed, power consumption, availability of several commercial sources, etc. In general, it will be noted that each random read-only memory requires only a very small number of chips, and that the other required operations are one or two chips.

A three-input "or" gate, for example, will serve to check for a non-zero state of the three check bits, in error detection circuit 66, FIG. 4. A particularly convenient structure for the buffers, 44 in FIG. 3 and 54 in FIG. 4, used at the transmitter 12, FIG. 1, and receiver 14 would be that of a "stack" or "last-in, first-out" memory. This would greatly facilitate the use of strategies involving different distances back in the data stream history on successive repeat attempts.

A microprocessor chip could be used as a convenient controller for either the transmitter 12 or the receiver 14, although much simpler logic would be adequate. A microprocessor augmented by memory and one or two auxiliary chips could implement either part of the system at the lower data rates.

Obviously, many modifications and variations of the present invention are possible in the light of the above teachings. It is therefore to be understood that within the scope of the appended claims the invention may be practiced otherwise than as specifically described.

What is claimed is:

1. A secure communication system transmitter for accepting a first sequence of binary words and for transmitting a signal comprising a second sequence of binary words comprising:
   a first adder having first and second inputs and an output, said first sequence of binary words being applied to said first adder first input;
   a first addressable storage device having an input connected to said first adder output and having an output;
   a delay network having an input connected to said first addressable storage means output and having an output, said delay network output being connected to said first adder second input;
   a second addressable storage device having an input connected to said delay network output and having an output;
   a second adder having a first input connected to said output of said first addressable storage device and having a second input connected to said output of said second addressable storage device and having an output, whereby the output of said second adder is said second sequence of binary words.

2. The secure communication system transmitter of claim 1 wherein:
   said first adder comprises a modulo-2 adder.

3. The secure communication system transmitter of claim 2 wherein:
   said first and second addressable storage device comprise read-only-memories.

4. The secure communication system transmitter of claim 3 wherein:
   said second adder comprises a modulo-2 adder.

5. The secure communication system transmitter of claim 1 further comprising:
   a buffer storage device connected to said output of said second adder.

6. A secure communications system receiver for receiving an encrypted sequence of binary words and for decoding said encrypted sequence of binary words so as to reconstruct a non-encrypted sequence of binary words comprising:
   a first adder having first and second inputs and an output, for receiving on said first input said encrypted sequence of binary words;
   a delay netowrk having an input connected to said first adder output and having an output;
   a first addressable storage device having an input connected to the output of said delay network and having an output, said first addressable storage device output being connected to said first adder second input;
   a second addressable storage device having an input connected to said first adder output and having an output;
   a second adder having a first input connected to said second addressable storage device output and having a second input connected to said delay network output, whereby the output of said second adder comprises said non-encrypted sequence of binary words.

7. The secure communication system receiver of claim 6 further comprising:
   a buffer memory having an input and an output both connected to said first adder output.

8. The secure communication system receiver of claim 6 wherein:
said first adder comprises a modulo-2 adder.

9. The secure communication system receiver of claim 8 wherein:
said first and second addressable storage devices comprise read-only-memories.

10. The secure communication system receiver of claim 8 wherein:
said second adder comprises a modulo-2 adder.

11. The secure communication system of claim 1 wherein said first addressable storage device comprises a read-only-memory having a plurality of storage cells each containing one of a first sequence of random numbers.

12. The secure communication system of claim 11 wherein:
said second addressable storage device comprises a read-only-memory having a plurality of storage cells each containing one of a second sequence of random numbers.

13. A secure communication system including a transittter for accepting a first sequence of binary words and for transmitting a second, encrypted sequence of binary words, and further including a receiver for receiving said encrypted sequence of binary words and for decoding said encrypted sequence of binary words so as to provide an output that comprises said first sequence of binary words wherein:
said transmitter comprises:
a first adder having first and second inputs and an output, said first sequence of binary words being applied to said first adder first input;
a first addressable storage device having an input connected to said first adder output and having an output;
a delay network having an input connected to said first addressable storage means output and having an output, said delay network output being connected to said first adder second input;
a second addressable storage device having an input connected to said delay network output and having an output;
a second adder having a first input connected to said output of said first addressable storage device and having a second input connected to said output of said second addressable storage device and having an output, whereby the output of said second adder is said second, encrypted sequence of binary words; and wherein said receiver comprises:
a third adder having a first and second input and an output, for receiving on said first input said second, encrypted sequence of binary words;
a receiver delay network having an input connected to said third adder output and having an output;
a third addressable storage device having an output and having an input connected to said receiver delay network output, said third addressable storage device output being connected to said third adder second input;
a foruth addressable storage device having an input connected to said third adder output and having an output;
a fourth adder having a first input connected to said fourth addressable storage device output and having a second input connected to said receiver delay network output, whereby the output of said fourth adder comprises said first sequence of binary words.

14. The secure communication system of claim 22 wherein:
said first, second, third, and fourth addressable storage device comprises read-only-memories.

15. The secure communication system of claim 13 wherein:
said transmitter and said receiver are connected together by a fiber optic link.

* * * * *